United States Patent
Kennewick et al.

(10) Patent No.: US 8,069,046 B2
(45) Date of Patent: *Nov. 29, 2011

(54) DYNAMIC SPEECH SHARPENING

(75) Inventors: Robert A. Kennewick, Seattle, WA (US); Min Ke, Bothell, WA (US); Michael Tjalve, Bellevue, WA (US); Philippe Di Cristo, Bellevue, WA (US)

(73) Assignee: VoiceBox Technologies, Inc., Bellevue, WA (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/608,572

(22) Filed: Oct. 29, 2009

(65) Prior Publication Data
US 2010/0049514 A1 Feb. 25, 2010

Related U.S. Application Data

(63) Continuation of application No. 11/513,269, filed on Aug. 31, 2006, now Pat. No. 7,634,409.

(60) Provisional application No. 60/712,412, filed on Aug. 31, 2005.

(51) Int. Cl.
*G10L 15/00* (2006.01)

(52) U.S. Cl. .................. 704/257; 704/235; 704/231

(58) Field of Classification Search .............. 704/231, 704/235, 240, 256, 243, 244, 257, 242, 250, 704/270, 270.1
See application file for complete search history.

(56) References Cited

U.S. PATENT DOCUMENTS

| | | | |
|---|---|---|---|
| 4,430,669 A | 2/1984 | Cheung | 358/122 |
| 5,027,406 A | 6/1991 | Roberts et al. | 381/43 |
| 5,155,743 A | 10/1992 | Jacobs | 375/28 |
| 5,274,560 A | 12/1993 | LaRue | 364/444 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |

(Continued)

FOREIGN PATENT DOCUMENTS

EP 1 646 037 4/2006

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Huyen X. Vo

(74) *Attorney, Agent, or Firm* — Pillsbury Winthrop Shaw Pittman LLP

(57) ABSTRACT

An enhanced system for speech interpretation is provided. The system may include receiving a user verbalization and generating one or more preliminary interpretations of the verbalization by identifying one or more phonemes in the verbalization. An acoustic grammar may be used to map the phonemes to syllables or words, and the acoustic grammar may include one or more linking elements to reduce a search space associated with the grammar. The preliminary interpretations may be subject to various post-processing techniques to sharpen accuracy of the preliminary interpretation. A heuristic model may assign weights to various parameters based on a context, a user profile, or other domain knowledge. A probable interpretation may be identified based on a confidence score for each of a set of candidate interpretations generated by the heuristic model. The model may be augmented or updated based on various information associated with the interpretation of the verbalization.

8 Claims, 3 Drawing Sheets

U.S. PATENT DOCUMENTS

| | | | | |
|---|---|---|---|---|
| 5,488,652 | A | 1/1996 | Bielby et al. | 379/88 |
| 5,499,289 | A | 3/1996 | Bruno et al. | 379/220 |
| 5,500,920 | A | 3/1996 | Kupiec | 395/2.79 |
| 5,517,560 | A | 5/1996 | Greenspan | 379/114 |
| 5,533,108 | A | 7/1996 | Harris et al. | 379/201 |
| 5,537,436 | A | 7/1996 | Bottoms et al. | 375/222 |
| 5,539,744 | A | 7/1996 | Chu et al. | 370/60 |
| 5,557,667 | A | 9/1996 | Bruno et al. | 379/201 |
| 5,563,937 | A | 10/1996 | Bruno et al. | 379/201 |
| 5,590,039 | A | 12/1996 | Ikeda et al. | 395/759 |
| 5,617,407 | A | 4/1997 | Bareis | 369/275.3 |
| 5,633,922 | A | 5/1997 | August et al. | 379/220 |
| 5,675,629 | A | 10/1997 | Raffel et al. | 379/58 |
| 5,696,965 | A | 12/1997 | Dedrick | 395/610 |
| 5,708,422 | A | 1/1998 | Blonder et al. | 340/825.34 |
| 5,721,938 | A | 2/1998 | Stuckey | 395/754 |
| 5,722,084 | A | 2/1998 | Chakrin et al. | 455/551 |
| 5,742,763 | A | 4/1998 | Jones | 395/200.3 |
| 5,748,841 | A | 5/1998 | Morin et al. | 395/2.66 |
| 5,752,052 | A | 5/1998 | Richardson et al. | 395/759 |
| 5,754,784 | A | 5/1998 | Garland et al. | 395/200.49 |
| 5,761,631 | A | 6/1998 | Nasukawa | 704/9 |
| 5,774,859 | A | 6/1998 | Houser et al. | 704/275 |
| 5,794,050 | A | 8/1998 | Dahlgren et al. | 395/708 |
| 5,794,196 | A | 8/1998 | Yegnanarayanan et al. | 704/255 |
| 5,797,112 | A | 8/1998 | Komatsu et al. | 701/201 |
| 5,799,276 | A | 8/1998 | Komissarchik et al. | 704/251 |
| 5,802,510 | A | 9/1998 | Jones | 707/2 |
| 5,832,221 | A | 11/1998 | Jones | 375/200.36 |
| 5,839,107 | A | 11/1998 | Gupta et al. | 704/270 |
| 5,867,817 | A | 2/1999 | Catallo et al. | 704/255 |
| 5,878,385 | A | 3/1999 | Bralich et al. | 704/9 |
| 5,878,386 | A | 3/1999 | Coughlin | 704/10 |
| 5,892,813 | A | 4/1999 | Morin et al. | 379/88.01 |
| 5,895,464 | A | 4/1999 | Bhandari et al. | 707/3 |
| 5,895,466 | A | 4/1999 | Goldberg et al. | 707/5 |
| 5,897,613 | A | 4/1999 | Chan | 704/210 |
| 5,902,347 | A | 5/1999 | Backman et al. | 701/200 |
| 5,911,120 | A | 6/1999 | Jarett et al. | 455/417 |
| 5,918,222 | A | 6/1999 | Fukui et al. | 707/1 |
| 5,926,784 | A | 7/1999 | Richardson et al. | 704/9 |
| 5,933,822 | A | 8/1999 | Braden-Harder et al. | 707/5 |
| 5,953,393 | A | 9/1999 | Culbreth et al. | 379/88.25 |
| 5,960,399 | A | 9/1999 | Barclay et al. | 704/270 |
| 5,960,447 | A | 9/1999 | Holt et al. | 707/500 |
| 5,963,894 | A | 10/1999 | Richardson et al. | 704/9 |
| 5,963,940 | A | 10/1999 | Liddy et al. | 707/5 |
| 5,987,404 | A | 11/1999 | Della Pietra et al. | 704/9 |
| 5,991,721 | A | 11/1999 | Asano et al. | 704/244 |
| 5,995,119 | A | 11/1999 | Cosatto et al. | 345/473 |
| 5,995,928 | A | 11/1999 | Nguyen et al. | 704/251 |
| 6,009,382 | A | 12/1999 | Martino et al. | 704/1 |
| 6,014,559 | A | 1/2000 | Amin | 455/413 |
| 6,018,708 | A | 1/2000 | Dahan et al. | 704/244 |
| 6,021,384 | A | 2/2000 | Gorin et al. | 704/1 |
| 6,044,347 | A | 3/2000 | Abella et al. | 704/272 |
| 6,049,602 | A | 4/2000 | Foladare et al. | 379/265 |
| 6,049,607 | A | 4/2000 | Marash et al. | 379/410 |
| 6,058,187 | A | 5/2000 | Chen | 380/21 |
| 6,078,886 | A | 6/2000 | Dragosh et al. | 704/270 |
| 6,081,774 | A | 6/2000 | De Hita et al. | 704/9 |
| 6,085,186 | A | 7/2000 | Christianson et al. | 707/3 |
| 6,101,241 | A | 8/2000 | Boyce et al. | 379/88.01 |
| 6,108,631 | A | 8/2000 | Ruhl | 704/270 |
| 6,119,087 | A | 9/2000 | Kuhn et al. | 704/270 |
| 6,134,235 | A | 10/2000 | Goldman et al. | 370/352 |
| 6,144,667 | A | 11/2000 | Doshi et al. | 370/401 |
| 6,144,938 | A | 11/2000 | Surace et al. | 704/257 |
| 6,154,526 | A | 11/2000 | Dahlke et al. | 379/88.03 |
| 6,160,883 | A | 12/2000 | Jackson et al. | 379/230 |
| 6,167,377 | A | 12/2000 | Gillick et al. | 704/240 |
| 6,173,266 | B1 | 1/2001 | Marx et al. | 704/270 |
| 6,173,279 | B1 | 1/2001 | Levin et al. | 707/5 |
| 6,175,858 | B1 | 1/2001 | Bulfer et al. | 709/206 |
| 6,185,535 | B1 | 2/2001 | Hedin et al. | 704/270 |
| 6,192,110 | B1 | 2/2001 | Abella et al. | 379/88.01 |
| 6,192,338 | B1 | 2/2001 | Haszto et al. | 704/257 |
| 6,195,634 | B1 | 2/2001 | Dudemaine et al. | 704/231 |
| 6,195,651 | B1 | 2/2001 | Handel et al. | 707/2 |
| 6,208,964 | B1 | 3/2001 | Sabourin | 704/244 |
| 6,208,972 | B1 | 3/2001 | Grant et al. | 704/275 |
| 6,219,346 | B1 | 4/2001 | Maxemchuk | 370/338 |
| 6,219,643 | B1 | 4/2001 | Cohen et al. | 704/257 |
| 6,226,612 | B1 | 5/2001 | Srenger et al. | 704/256 |
| 6,233,556 | B1 | 5/2001 | Teunen et al. | 704/250 |
| 6,233,559 | B1 | 5/2001 | Balakrishnan | 704/275 |
| 6,246,981 | B1 | 6/2001 | Papineni et al. | 704/235 |
| 6,269,336 | B1 | 7/2001 | Ladd et al. | 704/270 |
| 6,272,455 | B1 | 8/2001 | Hoshen et al. | 704/1 |
| 6,278,968 | B1 | 8/2001 | Franz et al. | 704/3 |
| 6,288,319 | B1 | 9/2001 | Catona | 84/609 |
| 6,292,767 | B1 | 9/2001 | Jackson et al. | 704/1 |
| 6,308,151 | B1 | 10/2001 | Smith | 704/235 |
| 6,314,402 | B1 | 11/2001 | Monaco et al. | 704/275 |
| 6,366,882 | B1 | 4/2002 | Bijl et al. | 704/235 |
| 6,366,886 | B1 | 4/2002 | Dragosh et al. | 704/270.1 |
| 6,374,214 | B1 | 4/2002 | Friedland et al. | 704/235 |
| 6,377,913 | B1 | 4/2002 | Coffman et al. | 704/8 |
| 6,381,535 | B1 | 4/2002 | Durocher et al. | 701/202 |
| 6,385,596 | B1 | 5/2002 | Wiser et al. | 705/51 |
| 6,385,646 | B1 | 5/2002 | Brown et al. | 709/217 |
| 6,393,428 | B1 | 5/2002 | Miller et al. | 707/102 |
| 6,397,181 | B1 | 5/2002 | Li et al. | 704/256 |
| 6,404,878 | B1 | 6/2002 | Jackson et al. | 379/221.01 |
| 6,405,170 | B1 | 6/2002 | Phillips et al. | 704/270 |
| 6,408,272 | B1 | 6/2002 | White et al. | 704/270.1 |
| 6,411,810 | B1 | 6/2002 | Maxemchuk | 455/453 |
| 6,415,257 | B1 | 7/2002 | Junqua et al. | 704/275 |
| 6,418,210 | B1 | 7/2002 | Sayko | 379/142.15 |
| 6,420,975 | B1 | 7/2002 | DeLine et al. | 340/815.4 |
| 6,429,813 | B2 | 8/2002 | Feigen | 342/357.13 |
| 6,430,285 | B1 | 8/2002 | Bauer et al. | 379/265.01 |
| 6,430,531 | B1 | 8/2002 | Polish | 704/257 |
| 6,434,523 | B1 | 8/2002 | Monaco | 704/257 |
| 6,434,524 | B1 | 8/2002 | Weber | 704/257 |
| 6,442,522 | B1 | 8/2002 | Carberry et al. | 704/257 |
| 6,446,114 | B1 | 9/2002 | Bulfer et al. | 709/206 |
| 6,453,153 | B1 | 9/2002 | Bowker et al. | 455/67.4 |
| 6,453,292 | B2 | 9/2002 | Ramaswamy et al. | 704/235 |
| 6,456,711 | B1 | 9/2002 | Cheung et al. | 379/265.09 |
| 6,466,654 | B1 | 10/2002 | Cooper et al. | 379/88.01 |
| 6,466,899 | B1 | 10/2002 | Yano et al. | 704/1 |
| 6,470,315 | B1 | 10/2002 | Netsch et al. | 704/256 |
| 6,498,797 | B1 | 12/2002 | Anerousis et al. | 370/522 |
| 6,499,013 | B1 | 12/2002 | Weber | 704/257 |
| 6,501,833 | B2 | 12/2002 | Phillips et al. | 379/88.07 |
| 6,501,834 | B1 | 12/2002 | Milewski et al. | 379/93.24 |
| 6,513,006 | B2 | 1/2003 | Howard et al. | 704/257 |
| 6,522,746 | B1 | 2/2003 | Marchok et al. | 379/406.03 |
| 6,523,061 | B1 | 2/2003 | Halverson et al. | 709/202 |
| 6,532,444 | B1 | 3/2003 | Weber | 704/257 |
| 6,539,348 | B1 | 3/2003 | Bond et al. | 704/9 |
| 6,549,629 | B2 | 4/2003 | Finn et al. | 381/92 |
| 6,553,372 | B1 | 4/2003 | Brassell et al. | 707/5 |
| 6,556,970 | B1 | 4/2003 | Sasaki et al. | 704/257 |
| 6,556,973 | B1 | 4/2003 | Lewin | 704/277 |
| 6,560,576 | B1 | 5/2003 | Cohen et al. | 704/270 |
| 6,567,778 | B1 | 5/2003 | Chang et al. | 704/257 |
| 6,567,797 | B1 | 5/2003 | Schuetze et al. | 707/2 |
| 6,570,555 | B1 | 5/2003 | Prevost et al. | 345/156 |
| 6,570,964 | B1 | 5/2003 | Murveit et al. | 379/67.1 |
| 6,574,597 | B1 | 6/2003 | Mohri et al. | 704/251 |
| 6,574,624 | B1 | 6/2003 | Johnson et al. | 707/5 |
| 6,581,103 | B1 | 6/2003 | Dengler | 709/231 |
| 6,587,858 | B1 | 7/2003 | Strazza | 707/102 |
| 6,594,257 | B1 | 7/2003 | Doshi et al. | 370/352 |
| 6,598,018 | B1 | 7/2003 | Junqua | 704/251 |
| 6,604,075 | B1 | 8/2003 | Brown et al. | 704/270.1 |
| 6,604,077 | B2 | 8/2003 | Dragosh et al. | 704/270.1 |
| 6,606,598 | B1 | 8/2003 | Holthouse et al. | 704/275 |
| 6,611,692 | B2 | 8/2003 | Raffel et al. | 455/552 |
| 6,614,773 | B1 | 9/2003 | Maxemchuk | 370/337 |
| 6,615,172 | B1 | 9/2003 | Bennett et al. | 704/257 |
| 6,622,119 | B1 | 9/2003 | Ramaswamy et al. | 704/9 |
| 6,629,066 | B1 | 9/2003 | Jackson et al. | 704/9 |
| 6,631,346 | B1 | 10/2003 | Karaorman et al. | 704/9 |
| 6,643,620 | B1 | 11/2003 | Contolini et al. | 704/270 |

| Patent No. | Date | Inventor | Class |
|---|---|---|---|
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,708 B1 | 3/2004 | Pickering | 704/235 |
| 6,708,150 B1 | 3/2004 | Hirayama et al. | 704/243 |
| 6,721,001 B1 | 4/2004 | Berstis | 348/231.3 |
| 6,721,706 B1 | 4/2004 | Strubbe et al. | 704/275 |
| 6,735,592 B1 | 5/2004 | Neumann et al. | 707/101 |
| 6,741,931 B1 | 5/2004 | Kohut et al. | 701/209 |
| 6,742,021 B1 | 5/2004 | Halverson et al. | 709/218 |
| 6,751,591 B1 | 6/2004 | Gorin et al. | 704/257 |
| 6,751,612 B1 | 6/2004 | Schuetze et al. | 707/4 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,829,603 B1 | 12/2004 | Chai et al. | 707/5 |
| 6,832,230 B1 | 12/2004 | Zilliacus et al. | 707/203 |
| 6,833,848 B1 | 12/2004 | Wolff et al. | 345/719 |
| 6,856,990 B2 | 2/2005 | Barile et al. | 707/10 |
| 6,865,481 B2 | 3/2005 | Kawazoe et al. | 701/211 |
| 6,877,134 B1 | 4/2005 | Fuller et al. | 715/500.1 |
| 6,901,366 B1 | 5/2005 | Kuhn et al. | 704/275 |
| 6,912,498 B2 | 6/2005 | Stevens et al. | 704/235 |
| 6,937,977 B2 | 8/2005 | Gerson | 704/201 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,973,387 B2 | 12/2005 | Masclet et al. | 701/211 |
| 6,975,993 B1 | 12/2005 | Keiller | 704/275 |
| 6,980,092 B2 | 12/2005 | Turnbull et al. | 340/425.5 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,975 B1 | 4/2006 | Pazandak et al. | 704/9 |
| 7,058,890 B2 | 6/2006 | George et al. | 715/728 |
| 7,062,488 B1 | 6/2006 | Reisman | 707/8 |
| 7,082,469 B2 | 7/2006 | Gold et al. | 709/231 |
| 7,092,928 B1 | 8/2006 | Elad et al. | 706/60 |
| 7,127,400 B2 | 10/2006 | Koch | 704/270.1 |
| 7,136,875 B2 | 11/2006 | Anderson et al. | 707/104.1 |
| 7,137,126 B1 | 11/2006 | Coffman et al. | 719/328 |
| 7,146,319 B2 | 12/2006 | Hunt | 704/254 |
| 7,197,069 B2 | 3/2007 | Agazzi et al. | 375/233 |
| 7,203,644 B2 | 4/2007 | Anderson et al. | 704/246 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,277,854 B2 | 10/2007 | Bennett et al. | 704/257 |
| 7,289,606 B2 | 10/2007 | Sibal et al. | 379/52 |
| 7,301,093 B2 | 11/2007 | Sater et al. | 84/615 |
| 7,340,040 B1 | 3/2008 | Saylor et al. | 379/67.1 |
| 7,366,669 B2 * | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,415,414 B2 | 8/2008 | Azara et al. | 704/270 |
| 7,424,431 B2 | 9/2008 | Greene et al. | 704/270 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,487,088 B1 | 2/2009 | Gorin et al. | 704/240 |
| 7,493,259 B2 | 2/2009 | Jones et al. | 704/257 |
| 7,493,559 B1 | 2/2009 | Wolff et al. | 715/727 |
| 7,502,738 B2 | 3/2009 | Kennewick et al. | 704/257 |
| 7,536,297 B2 | 5/2009 | Byrd et al. | 704/10 |
| 7,536,374 B2 | 5/2009 | Au | 706/55 |
| 7,558,730 B2 | 7/2009 | Davis et al. | 704/235 |
| 7,620,549 B2 | 11/2009 | Di Cristo et al. | 704/257 |
| 7,634,409 B2 | 12/2009 | Kennewick et al. | 704/257 |
| 7,640,160 B2 | 12/2009 | Di Cristo et al. | 704/257 |
| 7,676,365 B2 * | 3/2010 | Hwang et al. | 704/240 |
| 7,693,720 B2 | 4/2010 | Kennewick et al. | 704/275 |
| 7,788,084 B2 | 8/2010 | Brun et al. | 704/7 |
| 7,809,570 B2 | 10/2010 | Kennewick et al. | 704/257 |
| 7,818,176 B2 | 10/2010 | Freeman et al. | 704/270 |
| 7,831,433 B1 | 11/2010 | Belvin et al. | 704/275 |
| 7,873,523 B2 | 1/2011 | Potter et al. | 704/275 |
| 7,917,367 B2 | 3/2011 | Di Cristo et al. | 704/270.1 |
| 7,949,529 B2 | 5/2011 | Weider et al. | 704/270 |
| 7,983,917 B2 | 7/2011 | Kennewick et al. | 704/257 |
| 8,015,006 B2 | 9/2011 | Kennewick et al. | 704/236 |
| 2001/0041980 A1 | 11/2001 | Howard et al. | 704/270 |
| 2001/0049601 A1 | 12/2001 | Kroeker et al. | 704/254 |
| 2002/0035501 A1 | 3/2002 | Handel et al. | 705/10 |
| 2002/0049805 A1 | 4/2002 | Yamada et al. | 709/202 |
| 2002/0065568 A1 | 5/2002 | Silfvast et al. | 700/94 |
| 2002/0069059 A1 | 6/2002 | Smith | 704/257 |
| 2002/0082911 A1 | 6/2002 | Dunn et al. | 705/14 |
| 2002/0087525 A1 | 7/2002 | Abbott et al. | 707/3 |
| 2002/0120609 A1 | 8/2002 | Lang et al. | 707/1 |
| 2002/0124050 A1 | 9/2002 | Middeljans | 709/203 |
| 2002/0138248 A1 | 9/2002 | Corston-Oliver et al. | 704/1 |
| 2002/0143535 A1 | 10/2002 | Kist et al. | 704/251 |
| 2002/0188602 A1 | 12/2002 | Stubler et al. | 707/3 |
| 2002/0198714 A1 | 12/2002 | Zhou | 704/252 |
| 2003/0014261 A1 | 1/2003 | Kageyama | 704/275 |
| 2003/0046346 A1 | 3/2003 | Mumick et al. | 709/205 |
| 2003/0064709 A1 | 4/2003 | Gailey et al. | 455/412 |
| 2003/0088421 A1 | 5/2003 | Maes et al. | 704/270.1 |
| 2003/0097249 A1 | 5/2003 | Walker et al. | 704/1 |
| 2003/0112267 A1 | 6/2003 | Belrose | 345/728 |
| 2003/0120493 A1 | 6/2003 | Gupta | 704/270.1 |
| 2003/0135488 A1 | 7/2003 | Amir et al. | 707/3 |
| 2003/0144846 A1 | 7/2003 | Denenberg et al. | 704/277 |
| 2003/0182132 A1 | 9/2003 | Niemoeller | 704/275 |
| 2003/0212550 A1 | 11/2003 | Ubale | 704/215 |
| 2003/0236664 A1 | 12/2003 | Sharma | 704/251 |
| 2004/0006475 A1 | 1/2004 | Ehlen et al. | 704/270.1 |
| 2004/0025115 A1 | 2/2004 | Sienel et al. | 715/513 |
| 2004/0044516 A1 | 3/2004 | Kennewick et al. | 704/5 |
| 2004/0166832 A1 | 8/2004 | Portman et al. | 455/412.1 |
| 2004/0167771 A1 | 8/2004 | Duan et al. | 704/10 |
| 2004/0193408 A1 | 9/2004 | Hunt | 704/209 |
| 2004/0193420 A1 | 9/2004 | Kennewick et al. | 704/257 |
| 2004/0199375 A1 | 10/2004 | Ehsani et al. | 704/4 |
| 2004/0243417 A9 | 12/2004 | Pitts, III et al. | 704/276 |
| 2005/0015256 A1 | 1/2005 | Kargman | 704/272 |
| 2005/0021334 A1 | 1/2005 | Iwahashi | 704/240 |
| 2005/0021826 A1 | 1/2005 | Kumar | 709/232 |
| 2005/0033574 A1 | 2/2005 | Kim et al. | 704/251 |
| 2005/0043940 A1 | 2/2005 | Elder | 704/9 |
| 2005/0114116 A1 | 5/2005 | Fiedler | 704/201 |
| 2005/0137850 A1 | 6/2005 | Odell | 704/4 |
| 2005/0246174 A1 | 11/2005 | DeGolia | 704/270 |
| 2006/0206310 A1 | 9/2006 | Ravikumar et al. | 704/9 |
| 2007/0033005 A1 | 2/2007 | Cristo et al. | 704/9 |
| 2007/0033020 A1 | 2/2007 | Francois et al. | 704/226 |
| 2007/0038436 A1 | 2/2007 | Cristo et al. | 704/9 |
| 2007/0043574 A1 | 2/2007 | Coffman et al. | 704/275 |
| 2007/0050191 A1 | 3/2007 | Weider et al. | 704/275 |
| 2007/0055525 A1 | 3/2007 | Kennewick et al. | 704/257 |
| 2007/0118357 A1 | 5/2007 | Kasravi et al. | 704/10 |
| 2007/0179778 A1 | 8/2007 | Gong et al. | 704/9 |
| 2007/0186165 A1 | 8/2007 | Maislos et al. | 715/728 |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0299824 A1 | 12/2007 | Pan et al. | 707/3 |
| 2008/0091406 A1 | 4/2008 | Baldwin et al. | 704/4 |
| 2008/0103761 A1 | 5/2008 | Printz et al. | 704/9 |
| 2008/0115163 A1 | 5/2008 | Gilboa et al. | 725/34 |
| 2008/0133215 A1 | 6/2008 | Sarukkai | 704/2 |
| 2008/0140385 A1 | 6/2008 | Mahajan et al. | 704/9 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |
| 2008/0319751 A1 | 12/2008 | Kennewick et al. | 704/257 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |

| | | | |
|---|---|---|---|
| 2009/0171664 A1 | 7/2009 | Kennewick et al. | 704/257 |
| 2009/0216540 A1 | 8/2009 | Tessel et al. | 704/275 |
| 2009/0271194 A1 | 10/2009 | Davis et al. | 704/235 |
| 2009/0299745 A1 | 12/2009 | Kennewick et al. | 704/257 |
| 2010/0023320 A1 | 1/2010 | Di Cristo et al. | 704/9 |
| 2010/0049501 A1 | 2/2010 | Kennewick et al. | 704/9 |
| 2010/0057443 A1 | 3/2010 | Di Cristo et al. | 704/9 |
| 2010/0063880 A1 | 3/2010 | Atsmon et al. | 705/14.53 |
| 2010/0145700 A1 | 6/2010 | Kennewick et al. | 704/257 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2011/0112827 A1 | 5/2011 | Kennewick et al. | 704/9 |
| 2011/0112921 A1 | 5/2011 | Kennewick et al. | 705/26.1 |
| 2011/0131036 A1 | 6/2011 | Di Cristo et al. | 704/9 |
| 2011/0131045 A1 | 6/2011 | Cristo et al. | 704/249 |

FOREIGN PATENT DOCUMENTS

| | | |
|---|---|---|
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE, vol. 91, No. 9, Sep. 1, 2003, XP011100665, pp. 1272-1305.*

Statement in Accordance with the Notice from the European Patent Office dated Oct. 1, 2007 Concerning Business Methods (OJ EPO Nov. 2007, 592-593), XP002456252.

\* cited by examiner

Traditional Grammar Tree

210

Grammar Tree with Linking Element

220

DYNAMIC SPEECH SHARPENING

CROSS REFERENCE TO RELATED APPLICATIONS

This application is a continuation of U.S. patent application Ser. No. 11/513,269, entitled "Dynamic Speech Sharpening," filed Aug. 31, 2006, which issued as U.S. Pat. No. 7,634,409 on Dec. 15, 2009, and which claims the benefit of U.S. Provisional Patent Application Ser. No. 60/712,412, entitled "Dynamic Speech Sharpening," filed Aug. 31, 2005, the contents of which are hereby incorporated by reference in their entirety.

In addition, this application is related to U.S. patent application Ser. No. 12/608,572, entitled "Dynamic Speech Sharpening," filed Oct. 29, 2009, which is a continuation of above-referenced U.S. patent application Ser. No. 11/513,269, and is further related to U.S. patent application Ser. No. 10/452,147, entitled "Systems and Methods for Responding to Natural Language Speech Utterance," filed Jun. 3, 2003, which issued as U.S. Pat. No. 7,398,209 on Jul. 8, 2008, U.S. patent application Ser. No. 10/618,633, entitled "Mobile Systems and Methods for Responding to Natural Language Speech Utterance," filed Jul. 15, 2003, which issued as U.S. Pat. No. 7,693,720 on Apr. 6, 2010, U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009, U.S. patent application Ser. No. 11/200,164, entitled "System and Method of Supporting Adaptive Misrecognition in Conversational Speech," filed Aug. 10, 2005, which issued as U.S. Pat. No. 7,620,549 on Nov. 17, 2009, and U.S. patent application Ser. No. 11/212,693, entitled "Mobile Systems and Methods of Supporting Natural Language Human-Machine Interactions," filed Aug. 29, 2005, which issued as U.S. Pat. No. 7,949,529 on May 24, 2011, the contents of each of which are hereby incorporated by reference in their entirety.

FIELD OF THE INVENTION

The invention is related generally to automated speech interpretation, and in particular, to enhancing the accuracy and performance of speech interpretation engines.

BACKGROUND OF THE INVENTION

The field of automated speech interpretation is in increasingly higher demand. One use of automated speech interpretation is to provide voice requests to electronic devices. This may enable a user to simply speak to an electronic device rather than manually inputting requests, or other information, through pressing buttons, uploading information, or by other request input methods. Controlling various electronic devices through speech may enable the user to use the electronic devices more efficiently.

However, existing technology in the field of automated speech interpretation, such as standard speech engines, automatic speech recognition (ASR), and other systems for interpreting speech, are unable to process a speech signal in an efficient manner, often constructing large grammars that include a large number of items, nodes, and transitions, which is a concern particularly for large-list recognition for embedded applications. If the grammar for an embedded application grows too much, it may not fit within the constrained space of an embedded application. With limited CPU power, response time and performance is easily affected due to the significant time needed to compile and load the grammar. Response time is further degraded because the speech engine has to parse through a large number of transition states to come up with a recognition result. Even when the speech engine is able to recognize a word, the results are often unreliable because large grammars introduce greater risk of confusion between items as the size of the grammar increases. Existing techniques focus on reducing the size of a grammar tree by removing command variants or criteria items, but this approach strips functionality from the application.

In addition to the performance problems associated with speech recognition engines that employ large word grammars, existing speech processing engines are unable to interpret natural human speech with a suitable accuracy to sufficiently control some electronic devices. In particular, speech interpretation engines still have substantial problems with accuracy and interpreting words that are not defined in a predetermined vocabulary or grammar context. Poor quality microphones, extraneous noises, unclear or grammatically incorrect speech by the user, or an accent of the user may also cause shortcomings in accuracy, such as when a particular sound cannot be mapped to a word in the grammar.

In light of these and other problems, there is a need for enhanced automated speech interpretation that may interpret natural human speech with an augmented accuracy.

SUMMARY OF THE INVENTION

According to one aspect of the invention, a system for enhancing automated speech interpretation is provided. The system may include a set of techniques for use in a speech-to-text engine to enhance accuracy and performance, for example, by reducing the search space of the speech engine. The problems with large-list recognition for embedded applications may also be improved by using phonetic dictation, which may recognize a phoneme string by disregarding the notion of words. The system may also use one or more post-processing techniques to sharpen an output of a preliminary speech interpretation made by a speech engine. The system may be modeled at least partially after one or more speech pattern recognition techniques used by humans, such as interpreting speech using words, word sequences, word combinations, word positions, context, phonetic similarities between two or more words, parts of speech, or other techniques.

In one implementation of the invention, the system may receive a verbalization made by a user, where a speech engine may receive the verbalization. The speech engine may output information relating to a plurality of preliminary interpretations of the verbalization, where the plurality of preliminary interpretations represent a set of best guesses at the user verbalization. According to one aspect of the invention, the performance of the speech engine may be improved by using phoneme recognition. Phoneme recognition may disregard the notion of words, instead interpreting a verbalization as a series of phonemes, which may provide out-of-vocabulary (OOV) capabilities, such as when a user misspeaks or an electronic capture devices drops part of a speech signal, or for large-list applications, such as city and street names or song titles, for example. Phoneme recognition may be based on any suitable acoustic grammar that maps a speech signal into a phonemic representation. For example, the English language may be broken down into a detailed grammar of the phonotactic rules of the English language. Portions of a word may be represented by a syllable, which may be further broken down into core components of an onset, a nucleus, and a coda, which may be further broken down into sub-categories. Various different acoustic grammars may be formed as trees with various branches representing many different syllables forming a speech signal.

According to another aspect of the invention, the performance of the speech engine and the phonemic recognition may be improved by pruning the search space used by the speech engine using a common phonetic marker. In one implementation, the acoustic grammar may be represented entirely by a loop of phonemes. In another implementation, the speech engine may reduce the search space by reducing the number of transitions in a grammar tree, thereby speeding up the process of compiling, loading, and executing the speech engine. For example, the phoneme loop may include a linking element between transitions. This may reduce the number of grammar transitions, such that grammar paths merge after a first transition and diverge after the linking element. In one implementation of the invention, a common acoustic element that is part of a speech signal may be used as the linking element. In one implementation of the invention, the acoustic element may be one that is very likely to be triggered even if it is unpronounced. For example, a schwa in the English language may be used as the linking element because schwa represents an unstressed, central vowel that is likely to be spoken even if unintended. Those skilled in the art will appreciate that acoustic models for different languages may use other frequently elided phonemes as linking elements to reduce the search space used by the speech engine.

The speech engine may generate a plurality of preliminary interpretations representing a set of best guesses at the user verbalization. The preliminary interpretations may be stored in a matrix, array, or another form, and may be provided to an interpretation sharpening module to determine a probable interpretation of a verbalization made by a user by applying heuristic policies against the preliminary interpretation to identify dominant words and/or phrases. According to various aspects of the invention, the interpretation sharpening module may include a policy module that may manage and/or provide one or more policies that enable the sharpening module to generate a plurality of probable interpretations of the verbalization made by the user. For example, according to one aspect of the invention, the plurality of preliminary interpretations may be applied against one or more policies to generate a set of hypotheses as to a candidate recognition. Each hypothesis may be reanalyzed to generate an interpretation score that may relate to a likelihood of the probable interpretation being a correct interpretation of the verbalization, and the preliminary interpretation corresponding to the highest (or lowest) interpretation score may then be designated as a probable interpretation of the verbalization. The designated probable interpretation may be stored and used for augmenting the policies to improve accuracy.

According to one aspect of the invention, the policy module may include one or more agents that represent domains of knowledge. The agents may compete using a weighted model to revise a preliminary interpretation by determining context and intent. Relevant substitution of suspect words and phrases may be based on phonetic similarities or domain appropriateness. A domain agent may include one or more domain parameters for determining a probable interpretation from a preliminary interpretation. For example, domain parameters may include a policy vocabulary, a word position in the verbalization, a word combination, a sentence structure, or other parameters. A domain agent may include a parameter weighting scheme that may weight individual parameters according to one or more weighting factors, such as, a frequency of use, a difficulty to understand, or other factors.

According to one aspect of the invention, the domain agents may revise a preliminary interpretation into a probable interpretation using phonetic fuzzy matching (PFM). In one implementation of the invention, the speech engine may output a phoneme stream that is applied against a model of phoneme feature similarities, drawn from domain agents, to identify a closest phonetic match using a multi-pass method. Domain agents may be loaded and prioritized into an M-Tree, which accounts for the possibility of the speech engine dropping or adding phonemes. An M-Tree may be an index structure that resolves similarity queries between phonemes using a closest-distance metric based on relative weightings of phoneme misrecognition, phoneme addition, and phoneme deletion. The M-Tree may be updated using an adaptive misrecognition model. For example, information about a verbalization and its components, as well as a probability that the probable interpretation was correct, may be stored and used for adapting the policy module for the user.

In one implementation of the invention, the domain agents in the policy module may include one or more profile agents that may manage and/or provide one or more profile policies for revising a preliminary interpretation of a phoneme stream. For example, a profile agent may correspond to a user and may include one or more profile parameters tailored to the user. The profile agent may be used as a base policy to interpret any verbalizations made by the user. In other implementations, a profile agent may correspond to a particular language, a regional accent, or other profiles for interpreting a user verbalization. The profile agents may be augmented to enable the system to provide more accurate interpretations of verbalizations made by the user. The augmentation may include a user augmentation, such as providing additional vocabulary (e.g., names in an address book), one or more personalized pronunciations or other pronunciation information, or other user provided augmentations. The augmentation may also include a non-user provided augmentation, such as updates generated by a third party (e.g., a commercial administration and/or maintenance entity), or other non-user provided augmentations. The augmentation may be automated, such as adjusting a profile parameter-weighting scheme through an adaptive misrecognition model, as discussed above.

In another implementation of the invention, the domain agents in the policy module may include one or more context agents that may manage and/or provide one or more context policies for revising a preliminary interpretation of a phoneme stream. For example, a context agent may correspond to a context, such as song titles, city and street names, movie titles, finance, or other contexts. A context agent may include one or more context parameters that may be tailored to a verbalization context. The context policy may enhance an ability of the system related to interpreting verbalizations made by the user in the verbalization context corresponding to the context agent. The context agents may be augmented to enable the system to provide more accurate interpretations of verbalizations made in a verbalization context corresponding to the context agent. The augmentation may include a user provided augmentation, a non-user provided augmentation, an automated augmentation, or other augmentations. The augmentation may be automated, such as adjusting a profile parameter-weighting scheme through an adaptive misrecognition model, as discussed above.

According to various implementations of the invention, the policy module may determine which profile agents and/or which context agents to use through a set of heuristics provided in a context-tracking module. In one implementation, the context-tracking module may use phonetic fuzzy matching to track a series of verbalizations by the user to identify a verbalization context. The context-tracking module may utilize one or more M-Trees to track the series of verbalizations and determine a closest phonetic match. The context-tracking module may track one or more past verbalization contexts for the series of verbalizations, one or more current verbalization contexts for the series of verbalizations, and/or make predictions regarding one or more future verbalization contexts for the series of verbalizations. The policy module may utilize information about the verbalization context of the series of verbalizations generated by the context tracking module to manage and/or provide one or more profile and/or context agents.

According to one aspect of the invention, the system may include an interpretation history analysis module that may enable the system to augment one or more domain agents based on an analysis of past interpretations related to previously interpreted verbalizations. The augmentations enabled by the interpretation history analysis module may include a user augmentation, a third-party augmentation, an automated augmentation, or other augmentations. The interpretation history analysis module may include an information storage module that may store interpretation information related to past verbalizations, such as one or more preliminary interpretations associated with a past verbalization, one or more interpretation scores associated with a past verbalization, one or more probable interpretations associated with a past verbalization, whether or not a past verbalization was interpreted correctly, or other information. A frequency module may be included in the interpretation history module, and the frequency module may use some or all of the information stored in the information storage module to generate one or more frequencies related to one or more past verbalizations. For example, the frequency module may calculate a frequency of word usage, word combinations, phonetic homonyms, interpretation errors for a particular verbalization, or other frequencies.

The Information generated and/or stored by the interpretation history analysis module may be used to augment the profile and/or context agents in order to enhance the accuracy of subsequent interpretations. In some implementations, an adaptive misrecognition model may use one or more generated frequencies to augment one or more agents. For example, one or more parameters and/or weighting schemes of an agent or phonetic model may be augmented based on a frequency generated by the interpretation history analysis module. Other augmentations using information stored and/or generated by the interpretation history analysis module may be made, and the system may include a policy agent handler that may augment, update, remove, and/or provide one or more domain agents to the system. A domain agent may comprise a profile or context agent, and the policy agent handler may be controlled, directly or indirectly by a third party (e.g. a commercial entity, etc.). The policy agent handler may augment, update, remove, and/or provide domain agents to the system as part of a commercial agreement, such as a licensing agreement, a subscription agreement, a maintenance agreement, or other agreements.

Other objects and advantages of the invention will be apparent to those skilled in the art based on the following detailed description and accompanying drawings.

DETAILED DESCRIPTION

Figure 1:
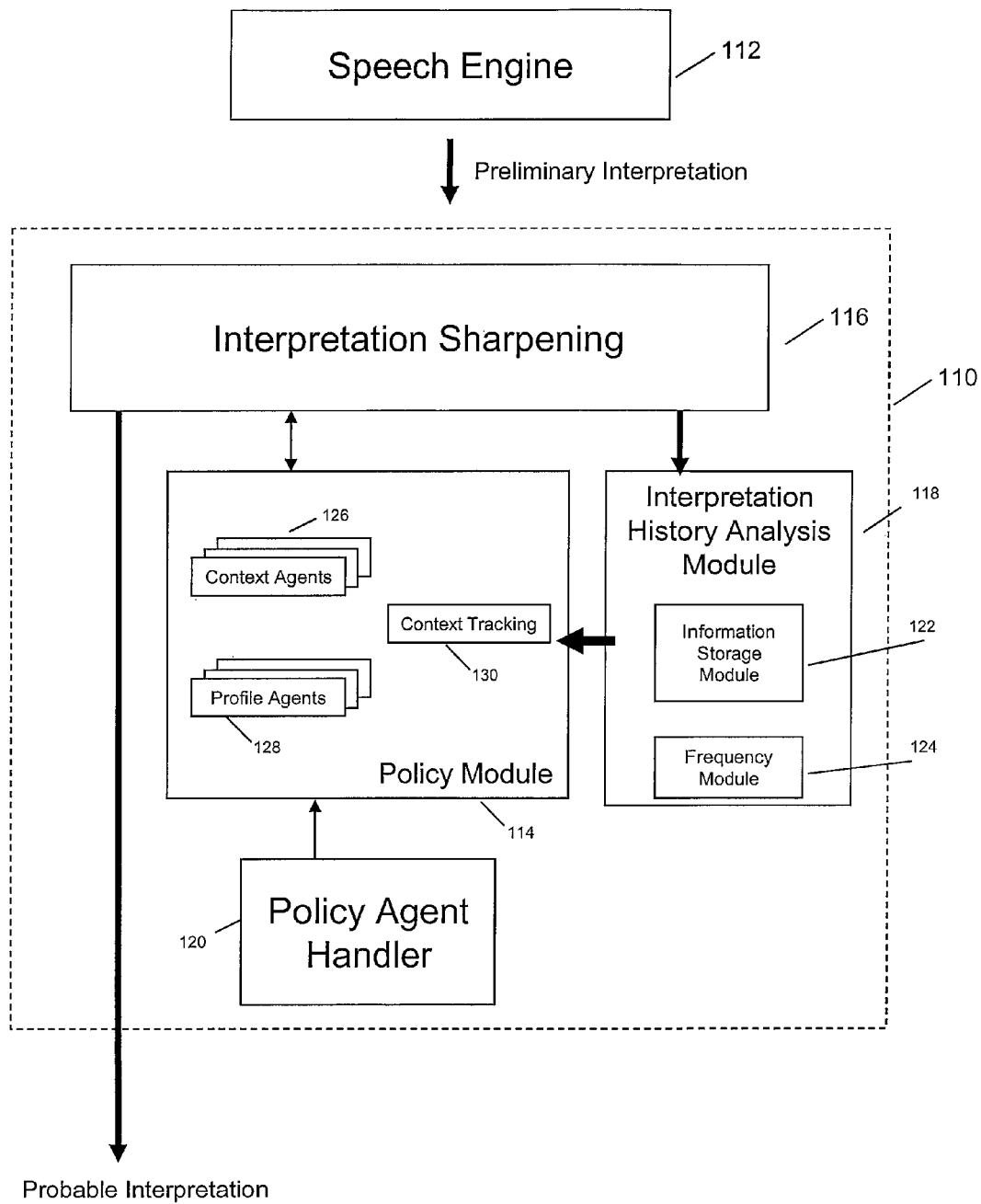
FIG. 1 illustrates an exemplary system for enhancing automated speech interpretation according to one implementation of the invention.

FIG. 1 illustrates an exemplary system for enhancing automated speech interpretation according to one implementation of the invention. A speech-to-text processing engine 112 may receive a user verbalization, and speech engine 112 may generate one or more preliminary interpretations of the user verbalization. The preliminary interpretations may represent a set of best guesses as to the user verbalization arranged in any predetermined form or data structure, such as an array, a matrix, or other forms. In one implementation of the invention, speech engine 112 may generate the preliminary interpretations by performing phonetic dictation to recognize a stream of phonemes, instead of a stream of words. Phonemic recognition provides several benefits, particularly in the embedded space, such as offering out-of-vocabulary (OOV) capabilities, improving processing performance by reducing the size of a grammar, and eliminating the need to train Statistic Language Models (SLMs). Those skilled in the art will recognize other advantages of phonemic recognition.

Speech engine 112 may apply the phoneme stream against one or more acoustic grammars that reliably map a speech signal to a phonemic representation in order to generate the plurality of preliminary interpretations. Characteristics of a speech signal may be mapped to a phonemic representation to construct a suitable acoustic grammar, and various acoustic grammars may be included in speech engine 112 to generate one or more preliminary interpretations according to the various acoustic grammars. For example, the English language may be mapped into a detailed acoustic grammar representing the phonotactic rules of English, where words may be divided into syllables, which may further be divided into core components of an onset, a nucleus, and a coda, which may be further broken down into one or more sub-categories.

Once the phonotactic rules of a speech signal have been identified, a detailed acoustic grammar tree may be constructed that accounts for the nuances of the speech signal. The acoustic grammar may include a loop of phonemes, or the phoneme loop may include a linking element to reduce a size of a search space associated with the grammar. Using the English language as an example, the grammar tree may include various branches representing English language syllables. The speech engine may traverse one or more grammar trees to generate one or more preliminary interpretations of a phoneme stream as a series of syllables that map to a word or phrase. By using phonemic recognition rather than word recognition, the size of the grammar can be reduced, which reduces the amount of time required to compile, load, and execute speech interpretation. Moreover, because the grammar maintains a high level of phonotactic constraints and therefore a large number of syllables, speech engine 112 may be very precise in generating phonemic representations of human verbalizations.

Figure 2:
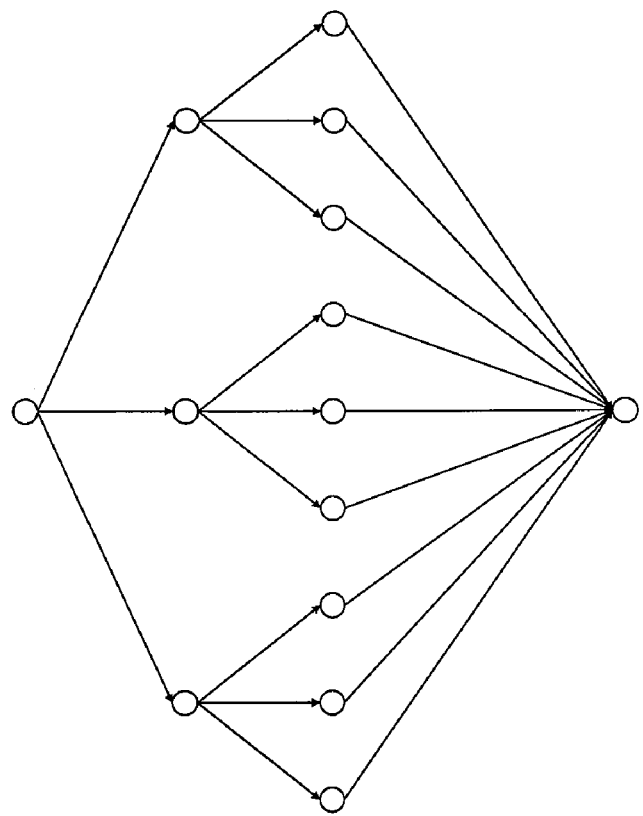
FIG. 2 illustrates an exemplary grammar tree for enhancing the performance of a speech engine according to one implementation of the invention.
Figure 2:
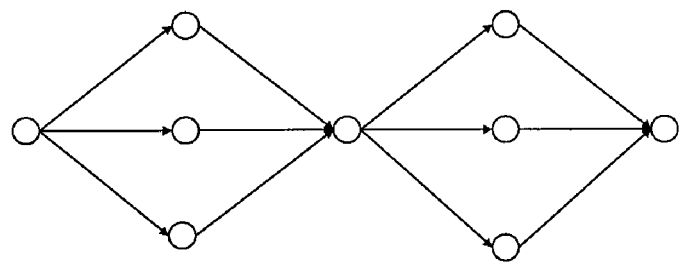

An acoustic grammar used by speech engine 112 may be further optimized to reduce compile time, load time, and execution time by reducing the size of a search space associated with the acoustic grammar. Referring now to FIG. 2, a traditional grammar tree 120 is compared to an exemplary grammar tree according to one aspect of the invention to demonstrate the performance enhancements of speech engine 112. In traditional speech processing engines, nodes in a grammar tree 210 tend to represent words, or large-list applications may be supported provided through a grammar tree 210 where the nodes represent items in the large-list. This requires the speech engine to parse through a large number of transition states to come up with a recognition result, which degrades response time. An example of this is seen in the following grammar structure:

"<street name><city name>"→e.g., "NE 24$^{th}$ Street Bellevue"

In the above example, a large list of street names is followed by a large list of city names. Assuming three elements in the list of street names, and three elements in the list of city names, this results in twenty-one transitions, which may be represented by traditional grammar tree 210. Every end-node of the first list is followed by all entries in the second list, potentially leading to very large grammars because most real-world large-list applications are likely to include much more than three list items. For example, a city may have hundreds or thousands of street names, and there may be hundreds or thousands of city names. Moreover, every element in the second segment of traditional grammar tree 210 is repeated, once for each first segment, which introduces redundancy.

According to an aspect of the invention, the problems with traditional grammar trees may be resolved by using phonemic acoustic grammars instead of large-lists. The grammar may further be improved by including linking elements to reduce the number of transition states in the grammar. Thus, a grammar tree with a linking element 220 will merge after a first segment and then spread out again at a second segment, where the segments may represent a phoneme in an acoustic grammar, as discussed above. For example, assume a two-syllable word in an acoustic grammar consisting of three phonemes, which is able to reduce the number of transitions from twenty-one in a traditional grammar tree 210 to twelve in a grammar tree with a linking element 220. Two syllables and three phonemes are chosen to show the reduction in search space in a grammar tree with a linking element 220 as opposed to a corresponding traditional grammar tree 210, although a real-world acoustic grammar modeled after a language is likely to have a maximum of roughly fifty phonemes. Moreover, the search space may be further reduced by restricting available transitions based on phonotactic constraints for an acoustic model.

Using the approach described in FIG. 2, adding a linking element to an acoustic grammar may reduce both grammar size and response time. Part of a speech signal may be mapped to the linking element in order to maintain the phonotactic rules of the acoustic grammar. The linking element may be an acoustic element that is likely to be triggered even if unpronounced. For example, a schwa represents an unstressed, central vowel in the English language (e.g., the first and last sound in the word "arena" is schwa). The phoneme schwa is an ideal linking element because of how it is represented in a frequency spectrum. That is, schwa is a brief sound and when a person opens their mouth to speak, there is a strong likelihood of passing through the frequencies of schwa even if unintended. Those skilled in the art will recognize that this approach may be extended to acoustic models of speech signals for other languages by using frequently elided phonemes as linking elements to reduce the search space of an acoustic grammar.

Referring again to FIG. 1, speech engine 112 may receive a user verbalization and process the verbalization into a plurality of preliminary interpretations using the techniques described above. That is, the verbalization may be interpreted as a series of phonemes, and the series of phonemes may be mapped to one or more preliminary interpretations by traversing one or more acoustic grammars that are modeled after grammar 220 of FIG. 2. The plurality of preliminary interpretations may take the form of words, parts of words, phrases, utterances, or a combination thereof, and the plurality of preliminary interpretations may be arranged as a matrix, an array, or in another form. The plurality of preliminary interpretations are then passed to a speech sharpening engine 110 for deducing a most probable interpretation of the verbalization.

According to various aspects of the invention, speech sharpening engine 110 may include an interpretation sharpening module 116, a policy module 114, an interpretation history analysis module 118, and a policy agent handler 120. The plurality of preliminary interpretations may be received by interpretation sharpening module 116, which forwards the preliminary interpretations to policy module 114 for further processing. Policy module 114 may include one or more context agents 126, one or more profile agents 128, and a context tracking module 130 that collectively revise the plurality of preliminary interpretations into a set of hypotheses that represent candidate recognitions of the verbalization. Policy module 114 may assign each hypothesis an interpretation score, and interpretation sharpening module 116 may designate the hypothesis with the highest (or lowest) interpretation score as a probable interpretation.

According to one aspect of the invention, policy module 114 may include one or more context agents 126. Context agents 126 may represent domains of knowledge corresponding to a given context, such as song titles, city and street names, finance, movies, or other contexts. Context agents 126 may use context objects and associated dynamic languages to represent a corresponding context. Policy module 114 may also include one or more profile agents 128. Profile agents 128 may represent domains of knowledge corresponding to a given profile, such as a specific user, language, accent, or other profiles. Profile agents 128 may use profile objects and dynamic languages to represent a corresponding profile. Dynamic languages for context agents 126 or profile agents 128 may specify vocabularies, word combinations, phrases, sentence structures, criteria, and priority weightings for any given context or profile, respectively. The priority weightings may weight individual parameters according to one or more weighting factors, such as assigning a weight according to a frequency of use, a difficulty to understand, or other factors. Policy module 114 may also include a context-tracking module 130. Context tracking module 130 may track a verbalization context of a consecutive series of verbalizations. Context tracking module 130 may utilize one or more conversation trees to track the series of verbalizations. Context tracking sub-module 214 may track one or more past or current verbalization contexts of the series of verbalizations, and/or may make predictions regarding one or more future verbalization contexts of the series of verbalizations. Policy module 114 may utilize information about the verbalization context, generated by context tracking module 130, to generate one or more sharpened interpretations and corresponding interpretation scores.

In some implementations, policy module 114 may use context tracking module 130 to apply objects from one or more context agents 126 and/or profile agents 128 to the preliminary interpretations provided by speech engine 112. The various agents may compete with each other using a set of heuristics in a phonetic fuzzy matcher, where an intent or context of the user may be identified based on the set of heuristics about how a request may be phrased in a given domain. A closest phonetic match may be identified for suspect words and/or phrases among the plurality of preliminary interpretations.

The phonetic fuzzy matcher may include an M-Tree that is populated with context objects, profile objects, and/or dynamic language data from one or more of context agents 126 and/or profile agents 128. M-Trees are known to those skilled in the art. The M-Tree may assign relative priority weights to the context objects, profile objects, and/or dynamic language data in order to account for the possibility of misrecognized phonemes, extraneous phonemes, or erroneously deleted phonemes. A closest distance metric associated with the M-Tree may be used given the relative weightings of phoneme misrecognition, phoneme addition, and phoneme deletion for various contexts and/or profiles.

According to one aspect of the invention, one or more passes may be taken over the plurality of preliminary interpretations to identify dominant words and/or phrases among the plurality of preliminary interpretations. Using the M-Tree weighted model, one or more candidate interpretations may be made based on relevant substitution of suspect words and/or phrases based on phonetic similarities and/or domain appropriateness. For example, if a set of dominant words appear to be a movie name, a candidate interpretation will substitute the relevant words and/or phrases to generate a candidate interpretation about movies. After a set of candidate interpretations have been generated, the candidate interpretations are analyzed using the M-Tree weighted model. With the relevant domains constrained by the candidate interpretations, a confidence or interpretation score may be assigned to each candidate interpretation, with the interpretation score representing a likelihood that a particular candidate interpretation is a correct interpretation of the verbalization. The candidate interpretations may then be returned to interpretation sharpening module 116, and interpretation sharpening module 116 may select a candidate interpretation with a highest (or lowest) interpretation score as a probable interpretation of the verbalization.

According to various implementations of the invention, speech sharpening engine 110 may include an interpretation history analysis module 118. Interpretation history analysis module 118 may include an information storage module 122 a frequency module 124. Information storage module 122 may store information related to verbalizations, including components of verbalizations, preliminary interpretations, dominant words and/or phrases, candidate interpretations, probable interpretations, and/or interpretation scores associated with verbalizations, as well as whether or not a verbalization was interpreted correctly, or other information. Interpretation history analysis module 118 may also include a frequency module 124. Frequency module 124 may use some or all of the information stored in information storage module 122 to generate one or more frequencies related to one or more past verbalizations. For example, frequency module 124 may calculate a word usage frequency, a word combination frequency, a frequency related to a set of verbalizations that are phonetically similar but have distinct meanings, an interpretation error frequency for a particular verbalization, or other frequencies.

Information stored and/or generated by interpretation history analysis module 118 may be used to augment speech sharpening engine 110. In some implementations, the information may be used to adjust various weights used in phonetic models, such as context agents 126 or profile agents 128, as well as adapting the relative weights in the M-Tree in context tracking module 130 to enhance accuracy for subsequent verbalizations. In another implementation, the stored information may be sent to a third-party or commercial entity for analyzing the data and developing new domain agents or further improving the accuracy of speech sharpening engine 110. For example, one or more parameters and/or weighting schemes of an agent may be augmented based on a frequency generated by interpretation history analysis module 118. Other augmentations related to information stored on and/or generated by interpretation history analysis module 118 may be made. Speech sharpening engine 110 may also include a policy agent handler 120 that may augment, update, remove, and/or provide one or more domain agents to policy module 114. A domain agent may include one or more new, modified, or updated context agents 126 and/or profile agents 128. Policy agent handler 120 may also augment or update the M-Tree in context tracking module 130 to adjustments in priority weighting schemes or phonetic models. Policy agent handler 120 may be controlled, directly or indirectly, by a third party, such as a commercial entity, and domain agents may be augmented, updated, removed, and/or provided by policy agent handler 120 as part of a commercial agreement, licensing agreement, subscription agreement, maintenance agreement, or other agreement.

Figure 3:
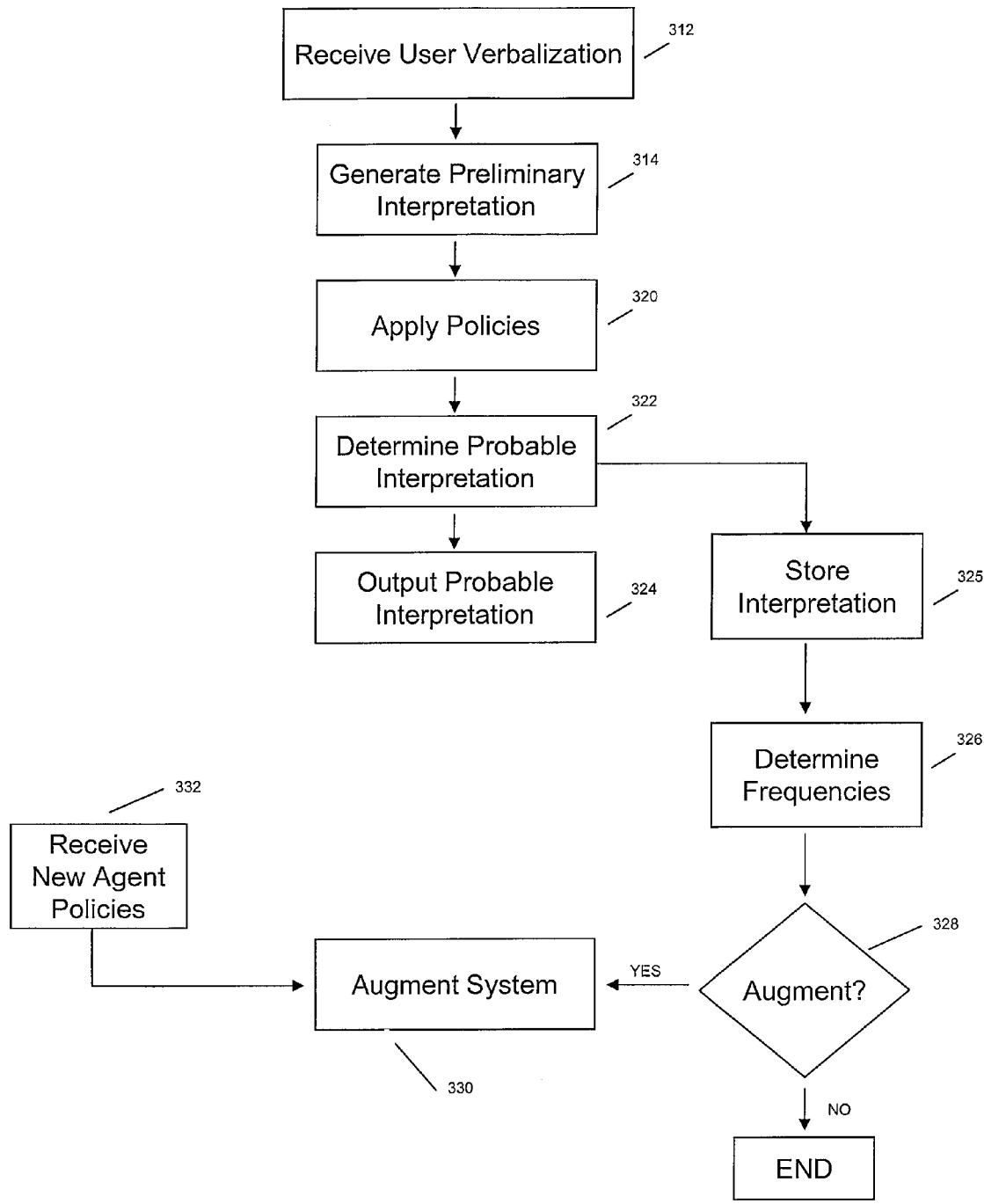
FIG. 3 illustrates an exemplary flow chart of a method for enhancing automated speech interpretation according to one implementation of the invention.

Referring to FIG. 3, a flow chart demonstrating an exemplary method for enhancing the performance and accuracy of speech interpretation is provided. The method may begin by receiving a user verbalization at an operation 312. The received user verbalization may be electronically captured at operation 312, such as by a microphone or other electronic audio capture device. The electronically captured verbalization may be provided to a speech interpretation engine, such as speech engine 112 in FIG. 1.

The speech interpretation may then generate one or more preliminary interpretations of the received verbalization at an operation 314. According to one implementation of the invention, the plurality of preliminary interpretations may be generated using phonetic dictation, grammar trees with linking elements, or any combination thereof to improve performance and enhance accuracy. Phonetic dictation and reducing a search space of a grammar tree by including linking elements is discussed in greater detail above. The preliminary interpretations may be arranged in any predetermined form, such as an array, a matrix, or other forms.

In an operation 320, the preliminary interpretations may be provided to a speech sharpening engine. The speech sharpening engine may take one or more passes over the plurality of preliminary interpretations to identify dominant words and/or phrases in operation 320. This information may then be used to generate one or more candidate interpretations. The candidate interpretations may be based on various domain agents, such as context agents and/or profile agents, which may be organized as a weighted domain model, such as an M-Tree. For example, if a set of dominant words sound like a movie name, apply policies operation 320 may generate a candidate interpretation that substitutes relevant words and/or phrases based on a domain agent populated with movie titles. Additional passes may be made over the candidate interpretations, which may be constrained by domain information associated with the candidate interpretations, to thereby generate a confidence score or interpretation score for each candidate interpretation. The interpretation score may represent a likelihood that a particular candidate interpretation is a correct interpretation of the verbalization received in operation 312. The operation of apply policies 320 is described in greater detail above in reference to FIG. 1.

The candidate interpretations and corresponding interpretation scores may then be analyzed to determine a probable interpretation in an operation 322. In one implementation of the invention, a candidate interpretation with a highest (or lowest) score may be designated as a probable interpretation. The probable interpretation may then be output in an operation 324, such as for use in a voice-activated vehicular navigation system, a voice-controlled server or desktop computer, or other electronic device that can be controlled using voice commands.

Information relating to the verbalization and the interpretations of the verbalization may be provided in a store interpretation operation 325. Store interpretation operation 324 may store interpretation information related to verbalizations, such as components of verbalizations, preliminary interpretations, dominant words and/or phrases, candidate interpretations, probable interpretations, and/or interpretation scores associated with verbalizations, as well as whether or not a verbalization was interpreted correctly, or other information. In some implementations of the invention, some or all of the interpretation information stored at store interpretation operation 324 may be used to determine one or more frequencies at a determine frequencies operation 326. The frequencies calculated at determine frequencies operation 326 may include one or more frequencies related to past verbalizations, such as, a word usage frequency, a word combination frequency, a frequency related to a set of verbalizations that are phonetically similar but have distinct meanings, an interpretation error frequency for a particular verbalization, or other frequencies. Determine frequencies operation 326 may be performed by interpretation history analysis module 118.

In various implementations, a decision may be made whether to augment a speech sharpening engine in an augmentation decision operation 328. The decision concerning system augmentation may be based at least in part on information generated at determine frequencies block 326, such as one or more frequencies, or other information. If it is decided that no augmentation is needed, no further action is taken until another verbalization is captured, and the method ends. In some instances, decision operation 328 may determine that augmentation may be made and control passes to an augment system operation 330. Augment system operation 330 may include making an augmentation to a speech sharpening engine. For example, one or more domain agents may be augmented to reflect probabilities of an interpretation being a correct interpretation of a verbalization, to update a user profile, or other augmentation. Dynamic languages associated with context agents and/or profile agents may be augmented, or parameters weights may be augmented to enhance accuracy when interpreting subsequent verbalizations. For example, an adaptive misrecognition technique may adjust the various weights in a phonetic model or update similarity weights for regional accents, or other augmentations may be made. In parallel to augment system operation 330, new agent policies may be received in an operation 332. For example, a third party or commercial entity may redesign or modify various domain agents, new domain agents may be developed and installed as plug-ins, domain agents that are unreliable may be removed, or other augmentations or modifications may be made. Thus, the method continually refines the domain agents and the weighting of various parameters in order to refine the accuracy of the speech sharpening engine for subsequent verbalizations.

The above disclosure has been described in terms of specific exemplary aspects, implementations, and embodiments of the invention. However, those skilled in the art will recognize various changes and modifications that may be made without departing from the scope and spirit of the invention. For example, references throughout the specification to "one implementation," "one aspect," "an implementation," or "an aspect" may indicate that a particular feature, structure, or characteristic is included in at least one implementation. However, the particular features, structures, or characteristics may be combined in any suitable manner in one or more implementations. Therefore, the specification and drawings are to be regarded as exemplary only, and the scope of the invention is to be determined solely by the appended claims.

What is claimed is:

1. A method for interpreting natural language utterances using out-of-vocabulary and noise toleration capabilities, comprising:
   recognizing, on an electronic device, a phoneme stream contained in an utterance received at the electronic device;
   mapping, on the electronic device, the recognized phoneme stream to a syllable series that includes one or more syllables that an acoustic grammar phonemically represents in accordance with an acoustic speech model; and
   generating, on the electronic device, an interpretation of the utterance that includes the one or more syllables in the syllable series mapped to the recognized phoneme stream.

2. The method of claim 1, wherein the acoustic speech model phonemically represents the one or more syllables with acoustic elements for an onset, a nucleus, and a coda.

3. The method of claim 1, wherein the acoustic speech model includes an unstressed central vowel that links sequential phonemic elements in the acoustic speech model.

4. A method for interpreting natural language utterances using out-of-vocabulary and noise toleration capabilities, comprising:
   recognizing, on an electronic device, a phoneme stream contained in an utterance received at the electronic device;
   mapping, on the electronic device, the recognized phoneme stream to a syllable series that includes one or more syllables using an acoustic grammar that constrains transitions between acoustic elements phonemically representing the one or more syllables according to one or more phonotactic rules of an acoustic speech model; and
   generating, on the electronic device, an interpretation of the utterance that includes the one or more syllables in the syllable series mapped to the recognized phoneme stream.

5. A system for interpreting natural language utterances using out-of-vocabulary and noise toleration capabilities, comprising:
   an input device configured to receive an utterance; and
   a speech interpretation engine configured to:
      recognize a phoneme stream contained in the received utterance;
      map the recognized phoneme stream to a syllable series that includes one or more syllables that an acoustic grammar phonemically represents in accordance with an acoustic speech model; and
      generate an interpretation of the utterance, wherein the generated interpretation includes the one or more syllables in the syllable series mapped to the recognized phoneme stream.

6. The system of claim 5, wherein the acoustic speech model phonemically represents the one or more syllables with acoustic elements for an onset, a nucleus, and a coda.

7. The system of claim 5, wherein the acoustic speech model includes an unstressed central vowel that links sequential phonemic elements in the acoustic speech model.

8. A system for interpreting natural language utterances using out-of-vocabulary and noise toleration capabilities, comprising:
  an input device configured to receive an utterance; and
  a speech interpretation engine configured to:
    recognize a phoneme stream contained in the received utterance;
    map the recognized phoneme stream to a syllable series that includes one or more syllables using an acoustic grammar that constrains transitions between acoustic elements phonemically representing the one or more according to one or more phonotactic rules of an acoustic speech model; and
    generate an interpretation of the utterance, wherein the generated interpretation includes the one or more syllables in the syllable series mapped to the recognized phoneme stream.

* * * * *